(12) United States Patent
Bier et al.

(10) Patent No.: US 6,565,967 B1
(45) Date of Patent: *May 20, 2003

(54) WATER-DISPERSING COATED SHAPED BODIES AND THEIR UTILIZATION

(75) Inventors: Peter Bier, Krefeld (DE); Peter Capellen, Krefeld (DE); Wolfgang Nising, St. Augustin (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/719,892

(22) PCT Filed: Jun. 17, 1999

(86) PCT No.: PCT/EP99/04183

§ 371 (c)(1),
(2), (4) Date: Dec. 18, 2000

(87) PCT Pub. No.: WO00/00555

PCT Pub. Date: Jan. 6, 2000

(30) Foreign Application Priority Data

Jun. 30, 1998 (DE) .......................................... 198 29 165

(51) Int. Cl.⁷ ................................................. B32B 9/04
(52) U.S. Cl. ....................... 428/336; 428/332; 428/412; 428/426; 428/480; 428/500; 428/523; 428/697; 428/702
(58) Field of Search ................................ 428/332, 426, 428/428, 446, 336, 412, 480, 500, 523, 689, 697, 702

(56) References Cited

U.S. PATENT DOCUMENTS

| 3,738,956 A | 6/1973 | Glatti et al. .............. 260/41 R |
|---|---|---|
| 3,865,619 A | 2/1975 | Pennewiss et al. ...... 117/138.8 |
| 4,382,115 A | 5/1983 | Takahashi ................ 428/424.6 |
| 4,478,909 A | 10/1984 | Taniguchi et al. .......... 428/331 |
| 4,576,864 A | 3/1986 | Krautter et al. ............. 428/328 |
| 5,908,582 A | 6/1999 | Feustel et al. .............. 252/354 |
| 6,165,256 A * | 12/2000 | Hayakawa et al. ........... 106/13 |
| 6,455,162 B1 * | 9/2002 | Pier ........................... 320/132 |

FOREIGN PATENT DOCUMENTS

| DE | 196 22 483 | 12/1996 |
| JP | 51-6193 | 1/1976 |
| JP | 51-81877 | 7/1976 |
| WO | 96/18691 | 6/1996 |
| WO | 98/03607 | 1/1998 |

OTHER PUBLICATIONS

English Translation of WO 98/03607 (Hayakawa et al.).*

Patent Abstracts of Japan, vol. 097, No. 003, Mar. 31, 1997 & JP 08 292301 A (Nissan Motor Co Ltd), Nov. 5, 1996.

Patent Abstracts of Japan, vol. 011, No. 080 (C–409), Mar. 11, 1987 & JP 61 235468 A (Kashiyuu KK), Oct. 20, 1986.

* cited by examiner

Primary Examiner—Robert Dawson
Assistant Examiner—Michael J Feely
(74) Attorney, Agent, or Firm—Joseph C. Gil; James R. Franks; John E. Mrozinski, Jr.

(57) ABSTRACT

A molding having at least part of its surface coated with a water-spreading coating is disclosed. The coating comprise a salt of sulfondicarboxylic diester, a water-insoluble oxide of metal or semi-metal and an acid/water mixture. It is applied to at least one surface of the molding.

7 Claims, No Drawings

WATER-DISPERSING COATED SHAPED BODIES AND THEIR UTILIZATION

The present invention relates to coated mouldings with a water-spreading coating and to the use thereof.

The term "water-spreading" is to be understood to mean the property of a surface for forming a contact angle of below 20 degrees with a drop of water applied on it. A water-spreading coating is accordingly a coating that brings about this property of a surface.

Mouldings with a water-spreading surface have the property that water which gets onto their surface is not concentrated there into drops which are separate from one another but rather that the drops spread out and, when they come into contact, run together to form a closed layer. As a result, an improved reflection of light on the surface that is moistened with water and a better transmission of light in the case of transparent mouldings are achieved. In addition, the dripping of water from the underside of the moulding is rendered difficult. These so-called anti-drop properties which impede the formation of drops are demanded, in particular, for various glazing materials consisting of inorganic glasses (hereinafter called glass for short) or of thermoplastics. In such cases it is desired that condensed water or condensate water deposited thereon does not fall off in the form of drops but rather that it runs off, following the downward gradient of the material, in a closed layer or at least in coherent paths on the lower edge.

Behaviour contrary to that of a water-spreading surface is displayed by the water-repellent surface. On water-repellent surfaces, water which gets onto such a surface is concentrated into drops that are separate from one another.

Numerous attempts to provide water-repellent surfaces of plastics with water-spreading layers are known from the literature. According to DE-A 21 61 645, coatings of this type are produced from a mixed polymer consisting of alkyl esters, hydroxyalkyl esters and quaternary aminoalkyl esters of acrylic or methacrylic acid and methylol ethers of methacrylamide by way of crosslinking agent. They firstly take up water, subject to swelling, and gradually pass over into a water-spreading state. However, as a consequence of the swelling the coating becomes soft and sensitive to mechanical damage.

With a view to improving the mechanical strength of water-spreading coatings, inorganic constituents such as colloidal metal oxides, in particular aluminium oxide, or colloidal silicon dioxide have been worked into the coating compositions (EP-A 7 681 877 or EP-A 7 606 193).

In order to achieve higher mechanical stability, coatings with hydrophilic inorganic constituents in a hydrophilic binding agent have been developed. According to JP-A 76 81 877, polyvinyl-chloride films or polymethylmethacrylate films are covered with a coating consisting of colloidal aluminium oxide by way of hydrophilising, hard constituent and polyvinyl alcohol and ammonium polyacrylate by way of binding agent. However, in the state swollen with water this coating is also sensitive to mechanical loads.

There have also already been attempts to work wetting-friendly agents into the plastic material itself from which the moulding is produced. For instance, water-spreading coverings for greenhouses and similar damp rooms are produced, according to DE-A 2 017 002, from a plastic that contains surface-active agents such as polyalkylene glycol. The water-spreading effect of this additive is not adequate. The resistance of the plastic to weathering is also impaired.

In JP-A 76 06 193 polymethacrylate sheets with a coating consisting of 95 parts of colloidal silicon dioxide and 5 parts of a dispersion of a hydrophobic acrylic resin are proposed as glazing means. However, the adhesion of this coating is totally unsatisfactory. This is true, above all, with respect to the moist state.

A better adhesion of a water-spreading coating on plastic mouldings is achieved, according to EP-A 51 405, with a covering synthesised from two layers, both layers containing colloidal silicon dioxide, a partially hydrolysed polysiloxane and polyvinyl alcohol by way of binding agent. The ratio of silicon to carbon is greater in the lower layer than in the outer layer.

Generalising, it is possible to note that although a coating having a good water-spreading property can usually be achieved with strongly hydrophilic covering materials, as a rule the coating is too soft in the swollen state. If it is desired to counteract this disadvantage by means of a stronger crosslinking or less hydrophilicity, then the water-spreading effect declines simultaneously with the mechanical sensitivity. Although silicon dioxide and various other oxides of metals or semimetals combine the advantages of great hardness and good wettability by means of water without swelling, they have the disadvantage that they do not adhere at all.

To the extent that use is made of binding agents with a view to anchoring the oxides on the surface of the plastic, the wettability of the oxides and hence the water-spreading effect of the coating declines, and the disadvantages of the binding agents appear: mechanical sensitivity in the case of hydrophilic binding agents, and insufficient spreading of water in the case of hydrophobic binding agents.

In DE-A 34 00 079 it was proposed to bind a water-spreading layer consisting substantially completely of silicon dioxide or other metal oxides of colloidal particle size, which itself has an insufficient adhesive strength on the layer of plastic, onto the water-repellent surface of a plastic moulding in firmly adhering manner by means of an adhesion-promoting layer of an organic polymer having polar groups that is not soluble in water and that is substantially not swellable.

The use of this adhesion-promoting layer or of other so-called primer layers with a view to better connection of the water-spreading layer to the surface of the plastic necessitates an additional process step in the course of coating, as a result of which the production of coated mouldings becomes more complicated and more costly.

All the named coating agents have the disadvantage that they have to be applied from organic solvents.

The object underlying the present invention is to make available mouldings provided with a water-spreading coating, said coating exhibiting, with simultaneous high mechanical strength, excellent adhesive strength without a layer of adhesion promoter.

In accordance with the invention this object is achieved by means of coated mouldings that can be obtained by coating a part of the surface of the moulding or the entire surface of the moulding with a coating agent containing A) 0.005 to 2 parts by weight of a compound represented by the general formula

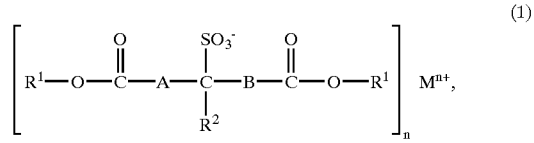

in which
R¹ is a hydrocarbon residue with 1 to 30 C atoms,
R² is hydrogen or a hydrocarbon residue with 1 to 6 C atoms,
A is a single bond or a divalent hydrocarbon residue with 1 to 30 C atoms,
B is a single bond or a divalent hydrocarbon residue with 1 to 30 C atoms,
n is 1, 2, 3 or 4 and
$M^{n+}$ is a cation with a positive charge n, B) 1 to 20 parts by weight of a water-insoluble oxide or of several water-insoluble oxides of a metal or semimetal, C) 80 to 100 parts by weight of a mixture of an acid and water, consisting of more than 90% water, with the proviso that the pH value of the coating agent is less than 6.

The present invention consequently provides the coated mouldings that have been described. The present invention further provides the use of the coated mouldings according to the invention as glazing material or as a constituent part of automobiles, greenhouses, swimming pools, stadia, railway stations, factory buildings, roof coverings, walls, lamp covers, architectural glazings, light cupolas, visors, spectacles, graphics, advertising hoardings, displays, packagings or of panes for means of locomotion of all types.

The coated mouldings according to the invention exhibit an excellent adhesive strength of the coating with simultaneous high mechanical strength. Layers of adhesion promoters are not required. A further advantage of the mouldings coated in accordance with the invention is that the coating agent predominantly contains water and therefore only contains small quantities of organic solvents. This results in economic and ecological advantages.

In the case of the compounds represented by the general formula (1), which are employed as Component A of the coating agent according to the invention, it is a question of sulfondicarboxylic diesters. These are employed either as free acid (i.e., n=1 and $M^{n+}=H^+$) or as salts. In case the salts are employed, these may be the salts of arbitrary cations. For example, mention may be made of: elemental cations, organic or inorganic molecular cations or organic or inorganic complex cations. Use may also be made of mixtures of various cations.

Preferred compounds according to the general formula (1) are compounds represented by the general formula (2)

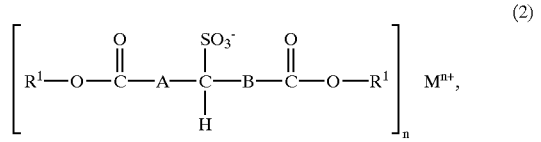

(2)

in which
R¹ is an aliphatic hydrocarbon residue with 1 to 30 C atoms,
A is a single bond or a divalent aliphatic hydrocarbon residue with 1 to 3 C atoms,
B is a single bond or a divalent aliphatic hydrocarbon residue with 1 to 3 C atoms,
n is 1 or2 and
$M^{n+}$ is a cation with a positive charge n.

Particularly preferred compounds according to the general formula (1) are compounds represented by the general formula (3)

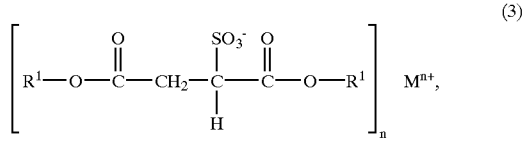

(3)

in which
R¹ is an aliphatic hydrocarbon residue with 1 to 30 C atoms,
n is 1 or 2 and
$M^{n+}$ is a cation with a positive charge n.

Amongst these, the alkali salts or the alkaline-earth salts or mixtures thereof are preferred. Alkali salts are quite particularly preferred. By way of example, mention may be made of sulfonsuccinic-bis(2-ethylhexyl ester)-sodium salt.

The compounds represented by the general formula (1) can be produced by known processes. Some of them are commercially available.

With a view to producing the coating agents, the compounds represented by the general formula (1) can be employed as pure substance or in the form of a solution in an arbitrary solvent or mixture of solvents. They are preferably employed in the form of a solution. For example, the commercial product Dapro® U99 produced by the Daniel Products Company, Inc., New Jersey, USA may be employed. This product is a solution of 40 g sulfonsuccinic-bis(2-ethylhexyl ester)sodium salt in 43 g 2-butoxyethanol, 4 g ethanol, 3 g water and 10 g polyethylene-glyco/fatty-acid ester (a mixture based substantially on polyethylene-glycovoleic-acid ester, polyethylene-glycol/palmitic-acid ester and polyethylene-glycol/stearic-acid ester).

In the case where the compound represented by the general formula (1) is employed in the form of a solution with a view to producing the coating agent according to the invention, this has the consequence that the coating agent contains other substances over and above the three components A, B and C mentioned, namely the solvents of the solution of A. The solution of the compound represented by the general formula (1) should preferably have a concentration from 5 to 95 wt.-%, in particular 10 to 90% and, quite particularly preferred, 20 to 60%.

By way of water-insoluble oxides of a metal or semimetal according to the invention, use is preferably made of oxides of elements pertaining to the 3rd or 4th main group or to the 2nd, 3rd, 4th, 5th, 6th, 7th or 8th subgroup of the periodic table of the elements. By way of examples, mention may be made of: aluminium oxide, silicon dioxide, titanium oxide, cerium oxide, zinc oxide, tin oxide, chromium oxide, indium oxide, zirconium oxide and iron oxides as well as pigments, in particular transparent pigments. The oxides according to the invention may contain small quantities of other elements as doping agents.

The use of oxides of a metal or semimetal pertaining to the 3rd or 4th main group of the periodic table of the elements is particularly preferred. By way of example, mention may be made of: aluminium oxide or silicon oxide.

The use of oxides of a metal or semimetal from the 4th main group of the periodic table of the elements is quite particularly preferred. Amongst these, silicon dioxide is most preferred.

The oxides of a metal or semimetal according to the invention are preferably used in the form of a sol—i.e., as an aqueous, colloidal solution—which preferably has a concentration amounting to 10 to 50 mass-% of the metal oxide and has particles which, on average, preferably have diameters measuring less than 5 µm.

The oxide particles in the sol according to the invention are preferably present with an average size of less than 200 nm, in particularly preferred manner in the range from 5 to 100 nm. The particle size is ascertained by means of an ultracentrifuge.

The mixture of an acid and water according to the invention consists of more than 90% water. It preferably consists of more than 95% water, in quite particularly preferred manner more than 98% water. It may contain organic or inorganic acids. Use is preferably made of weak acids. Weak acids are those acids which have a $pK_a$ value of more than 2. In particularly preferred manner use is made of aliphatic carboxylic acids. In quite particularly preferred manner use is made of acetic acid.

The coating agent according to the invention contains 0.005 to 2 parts by weight, preferably 0.01 to 0.5 parts by weight and, particularly preferred, 0.05 to 0.4 parts by weight, of Component A.

The coating agent according to the invention contains 1 to 20 parts by weight, preferably 2 to 20 parts by weight and, particularly preferred, 3 to 8 parts by weight, of Component B.

The coating agent according to the invention has a pH value of less than 6, preferably less than 5.

The coating agents according to the invention may optionally contain other components such as, for example, surfactants and organic solvents with a view to better wetting of the substrate, as well as flow-control agents or defoamers.

Production of the coating agents according to the invention is preferably effected by producing the sol of the oxide of a metal or semimetal that is employed in water or by diluting a commercially available sol with water to the desired concentration in the coating agent according to the invention, subsequently, in advantageous manner, by adjusting a weakly acidic pH, for example by addition of acetic acid, and by adding the quantity of Component A of the coating agent according to the invention that is stipulated for the coating agent.

In advantageous manner the coating agent and optionally also the sol of the oxide of a metal or semimetal that is optionally employed is filtered, so that the respective composition only contains particles with a particle diameter of, preferably, less than 5 $\mu$m.

The coating agents according to the invention may be applied onto the mouldings to be coated in accordance with all known processes, for instance by brushing, casting, rolling, spraying or any other known method. It is also possible to coat mouldings by immersion in the aqueous coating agents according to the invention, this manner of processing being suitable, in particular, for mouldings with cavities, such as double sheets of crossmembers, for example, since in this way the mouldings can also be coated from the inside.

With a view to producing the water-spreading, transparent coating on the mouldings without a layer of adhesion promoter, the applied coating agent according to the invention is dried and stoved at elevated temperature, preferably at 90 to 155° C., in particularly preferred manner at 110 to 135° C. The duration of this drying and stoving step conforms to the quantity of the applied coating agent according to the invention and may, where necessary, be determined by means of simple experiments carried out by an appropriate person skilled in the art.

The coating agents according to the invention are preferably applied in quantities from 3 to 15 g/m², in particularly preferred manner in quantities from 6 to 12 g/m², onto the moulding to be coated. The thickness of the coating preferably amounts to 0.1 to 0.5 $\mu$m; in particularly preferred manner it amounts to 0.2 to 0.4 $\mu$m. Coating of a plastic moulding with a coating agent according to the invention may be effected after, or alternatively already during, the production thereof.

The coating agents according to the invention are suitable for the coating of mouldings of any type. Use is preferably made of mouldings consisting of glass. Use is preferably made furthermore of mouldings consisting of thermoplastics. The latter are preferably transparent thermoplastics. In particular, these mouldings consist of polymethyl methacrylate, polystyrene, polyvinyl chloride or polycarbonate, preferably of polycarbonate.

The mouldings to be coated may take any form. They preferably take the form of a pane or a film. The pane or the film may be curved or flat.

The moulding may be coated on its entire surface or only on a part of a surface. Preferably 20 to 100% of the surface of the moulding is coated.

Thermoplastics suitable for coating are described, for example, in Becker/Braun, Kunststoff-Handbuch, Carl Hanser Verlag, Munich, Vienna. The plastics may contain additives.

According to the invention it is possible, in particular, for any polycarbonate to be coated.

Polycarbonates that are suitable in accordance with the invention are both homopolycarbonates and copolycarbonates. A mixture of the polycarbonates that are suitable in accordance with the invention can also be used.

The polycarbonates may be partially or totally replaced by aromatic polyester carbonates.

The polycarbonates may also contain polysiloxane blocks. The production thereof is described in, for example, U.S. Pat. No. 3,821,315, U.S. Pat. No. 3,189,662 and U.S. Pat. No. 3,832,419.

Preferred polycarbonates are those based on bisphenols of the general formula (4)

$$\text{HO-Z-OH} \qquad (4)$$

in which Z is a divalent organic residue with 6 to 30 C atoms that contains one or more aromatic groups.

Examples of bisphenols according to the general formula (4) are bisphenols that pertain to the following groups:
dihydroxydiphenyls,
bis(hydroxyphenyl)alkanes,
bis(hydroxyphenyl)cycloalkanes,
bis(hydroxyphenyl)sulfides,
bis(hydroxyphenyl)ethers,
bis(hydroxyphenyl)ketones,
bis(hydroxyphenyl)sulfones,
bis(hydroxyphenyl)sulfoxides and $\alpha,\alpha'$-bis (hydroxyphenyl)diisopropylbenzenes.

Derivatives of the named bisphenols, which are available, for example, as a result of alkylation or halogenisation on the aromatic rings of the named bisphenols, are also examples of bisphenols according to the general formula (4).

Examples of bisphenols according to the general formula (4) are, in particular, the following compounds:
hydroquinone,
resorcinol,
4,4'-dihydroxydiphenyl,
bis(3,5-dimethyl-4-hydroxyphenyl)methane,
bis(3,5-dimethyl-4-hydroxyphenyl)sulfone,
1,1-bis(3,5-dimethyl-4-hydroxyphenyl)-p/m-diisopropylbenzene, 1,1-bis(4-hydroxyphenyl)-1-phenylethane,
1,1-bis(3,5-dimethyl-4-hydroxyphenyl)cyclohexane,
1,1-bis(4-hydroxyphenyl)-3-methylcyclohexane,
1,1-bis(4-hydroxyphenyl)3,3-dimethylcyclohexane,
1,1-bis(4-hydroxyphenyl)4methylcyclohexane,
1,1-bis(4-hydroxyphenyl)cyclohexane,
1,1-bis(4-hydroxyphenyl)-3,3,5-trimethylcyclohexane,
2,2-bis(3,5-dichloro-4-hydroxyphenyl)propane,
2,2-bis(3-methyl-4-hydroxyphenyl)propane,
2,2-bis(3,5-dimethyl-4-hydroxyphenyl)propane,
2,2-bis(4-hydroxyphenyl)propane (i.e., bisphenol A),
2,2-bis(3-chloro-4-hydroxyphenyl)propane,
2,2-bis(3,5dibromo-4-hydroxyphenyl)propane,
2,4-bis(4-hydroxyphenyl)-2-methylbutane,
2,4-bis(3,5-dimethyl-4-hydroxyphenyl)-2-methylbutane,
α,α'-bis(4-hydroxyphenyl)-o-diisopropylbenzene,
α,α'-bis(4-hydroxyphenyl)-m-diisopropylbenzene (i.e., bisphenol M) and
α,α'-bis(4-hydroxyphenyl)-p-diisopropylbenzene.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on bisphenol A and 1,1-bis(4-hydroxyphenyl)-3,3,5-trimethylcyclohexane.

The bisphenols according to the general formula (4) that have been described may be produced in accordance with known processes, for example from the corresponding phenols and ketones.

Processes for producing the named bisphenols are described in, for example, the monograph by H. Schnell entitled "Chemistry and Physics of Polycarbonates", Polymer Reviews, Volume 9, pp 77–98, Interscience Publishers, New York, London, Sydney, 1964 and in U.S. Pat. No. 3,028,635, in U.S. Pat. No. 3,062,781, in U.S. Pat. No. 2,999,835, in U.S. Pat. No. 3,148,172, in U.S. Pat. No. 2,991,273, in U.S. Pat. No. 3,271,367, in U.S. Pat. No. 4,982,014, in U.S. Pat. No. 2,999,846, in DE-A 1 570 703, in DE-A 2 063 050, in DE-A 2 036 052, in DE-A 2 211 956, in DE-A 3 832 396 and in FR-A 1 561 518, as well as in the Japanese published applications having application Ser. No. 62039/1986, 62040/1986 and 105550/1986.

The production of 1,1-bis(4-hydroxyphenyl)-3,3,5-triethylcyclohexane is described in, for example, U.S. Pat. No. 4,982,014.

Polycarbonates may be produced in accordance with known processes. Suitable processes for producing polycarbonates are, for example, production from bisphenols with phosgene in accordance with the phase-interface process or from bisphenols with phosgene in accordance with the process in homogeneous phase, the so-called pyridine process, or from bisphenols with carbonic esters in accordance with the melt transesterification process. These production processes are described in, for example, H. Schnell, "Chemistry and Physics of Polycarbonates", Polymer Reviews, Volume 9, pp 31–76, Interscience Publishers, New York, London, Sydney, 1964. The production processes that have been mentioned are also described in D. Freitag, U. Grigo, P. R. Müller, H. Nouvertne, "Polycarbonates" in Encyclopedia of Polymer Science and Engineering, Volume 11, Second Edition, 1988, pages 648 to 718 and in U. Grigo, K. Kirchner and P. R. Müller, "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117 to 299.

The melt transesterification process is described, in particular, in H. Schnell, "Chemistry and Physics of Polycarbonates", Polymer Reviews, Volume 9, pp 44–51, Interscience Publishers, New York, London, Sydney, 1964 and also in DE-A 1 031 512, in U.S. Pat. No. 3,022,272, in U.S. Pat. No. 5,340,905 and in U.S. Pat. No. 5,399,659.

Carbonic diesters that can be employed for producing polycarbonates in accordance with the melt transesterification process are, for example, diaryl esters of carbonic acid, with the two aryl residues preferably each having 6 to 14 C atoms. The diesters of carbonic acid based on phenol or alkyl-substituted phenols—that is, for example, diphenyl carbonate or dicresyl carbonate—are preferably employed.

The polycarbonates that are suitable in accordance with the invention preferably have a weight-average molar mass ($\overline{M}_w$), which can be determined by, for example, ultracentrifugation or by scattered-light measurement, from 10,000 to 200,000 g/mole. In particularly preferred manner they have a weight-average molar mass from 12,000 to 80,000 g/mole.

The mean molar mass of the polycarbonates according to the invention can, for example, be adjusted in known manner by means of an appropriate quantity of chain terminators.

Suitable chain terminators are both monophenols and monocarboxylic acids. Suitable monophenols are, for example, phenol, p-chlorophenol, p-tert.-butylphenol, cumylphenol or 2,4,6-tribromophenol, as well as long-chain alkylphenols such as, for example, 4-(1,1,3,3-tetramethylbutyl)phenol or monoalkylphenols or dialkylphenols with a total of 8 to 20 C atoms in the alkyl substituents, such as, for example 3,5-di-tert.-butylphenol, p-tert.-octylphenol, p-dodecylphenol, 2-(3,5-dimethylheptyl)phenol or 4(3,5dimethylheptyl)phenol. Suitable monocarboxylic acids are benzoic acid, alkylbenzoic acids and halobenzoic acids.

Preferred chain terminators are phenol, p-tert.-butylphenol, 4-(1,1,3,3-tetramethylbutyl)phenol and cumylphenol.

The quantity of chain terminators preferably amounts to between 0.5 and 10 mole-%, relative to the sum of the bisphenols employed in each instance.

The polycarbonates that are suitable in accordance with the invention may be branched in known manner and, to be specific, preferably through the incorporation of trifunctional branching agents or branching agents of higher functionality. Suitable branching agents are, for example, those with three, or more than three, phenolic groups or those with three, or more than three, carboxylic groups.

Suitable branching agents are, for example, phloroglucinol, 4,6-dimethyl-2,4,6-tri(4-hydroxyphenyl) heptene-2,4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl) phenylmethane, 2,2-bis[4,4bis(4-hydroxyphenyl) cyclohexyl]-propane, 2,4-bis(4-hydroxyphenylisopropyl) phenol, 2,6-bis(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)phenyl)-terephthalic ester, tetra(4-hydroxyphenyl)methane, tetra(4-hydroxyphenylisopropyl)phenoxy)methane and 1,4-bis(4', 4"-dihydroxytriphenyl)methylbenzene, as well as 2,4-dihydroxybenzoic acid, trimesic acid, cyanuric chloride, 3,3-bis-(3-methyl14hydroxyphenyl)-2-oxo-2,3-dihydroindole, trimesic trichloride and α,α,α"-tris-(4-hydroxyphenol)-1,3,5-triisopropylbenzene.

Preferred branching agents are 3,3-bis(3-methyl4-hydroxyphenyl)-2-oxo-2,3-dihydroindole and 1,1,1-tris(4-hydroxyphenyl)ethane.

The quantity of the branching agents to be optionally employed preferably amounts to 0.05 mole-% to 2 mole-%, relative to moles of bisphenols employed.

In the case where the polycarbonate is produced in accordance with the phase-interface process, the branching agents may, for example, be submitted with the bisphenols and the chain terminators in the aqueous alkaline phase or may be added, dissolved in an organic solvent, together with the carbonic-acid derivatives. In the case of the transesterification process, the branching agents are preferably metered together with the dihydroxy aromatics or bisphenols.

With a view to modifying the properties, conventional additives may be admixed to the polycarbonates according to the invention and/or applied onto the surface of the mouldings. Conventional additives are, for example: fillers, reinforcing substances, stabilisers (for example, UV stabilisers, thermal stabilisers, gamma-ray stabilisers), antistatic agents, flow aids, mould-release agents, fire-protection agents, dyestuffs and pigments. The named additives and other suitable additives are described in, for example, G äichter, Müller, Kunststoff-Additive, 3rd Edition, Hanser-Veriag, Munich Vienna, 1989.

Other polymers may be admixed to the polycarbonates according to the invention, as a result of which so-called polymer blends are obtained. For example, blends may be produced from the polycarbonates according to the invention and polyolefins, in particular ABS polymers.

The coated mouldings according to the invention may, for example, be used as glazing material or as a constituent part of automobiles, greenhouses, swimming pools, stadia, railway stations, factory buildings, roof coverings, walls, lamp covers, architectural glazings, light cupolas, visors, spectacles, graphics, advertising hoardings, displays, packagings or of panes for means of locomotion of all types. The term 'glazing material' is to be understood to mean a material that can be employed in all instances where panes consisting of conventional inorganic glasses have customarily been employed or are still employed.

The invention is elucidated in more detail below in the following examples.

Production of the Coating Agents

Coating Agent A

To 416.7 g of completely desalinated water there are added, subject to stirring, 83.3 g silica sol (Levasil® 300F, produced by Bayer AG) which had previously been filtered through a 5 µm filter. The aqueous suspension is then adjusted with 98-% acetic acid to a pH value of 4.8 and is mixed with 1.5 g Dapro® U99 (a solution of 40 g sulfonsuccinic-bis(2-ethylhexyl ester)-sodium salt in 43 g 2-butoxyethanol, 4 g ethanol, 3 g water and 10 g polyethylene-glycol/fatty-acid ester (a mixture based substantially on polyethylene-glycol/oleic-acid ester, polyethylene-glyco/palmitic-acid ester and polyethylene-glycol/stearic-acid ester).

Levasil® 300F is an anionically stabilised silica sol produced by Bayer AG having a mean particle size from 7 to 8 nm or a specific surface of 300 m$^2$/g. Levasil® 300F has a solids content of 30 mass-% and a pH value of about 9.8. It contains a small quantity amounting to ≦0.2 wt.-% of formaldehyde in order to counter attack by microorganisms.

Coating Agent B

Production is effected in a manner analogous to that for coating agent A. Instead of Dapro® U99, however, there are added 0.675 g sulfonsuccinic-bis(2-ethylhexyl ester)-sodium salt in 0.825 g 2-butoxyethanol.

Coating Agent C

Production is effected in a manner analogous to that for coating agent A. Instead of the named solution, however, there are added 0.621 g sulfonsuccinic-bis(2-ethylhexyl ester)-sodium salt, 0.054 g polyethylene glycol (number-average molar mass: 1,000) in 0.754 g 2-butoxyethanol and 0.0705 g ethanol.

Coating Agent D

Production is effected in a manner analogous to that for coating agent C. Instead of the polyethylene glycol there are added 0.062 g polyethylene-glycol/fatty-acid ester (a mixture based substantially on polyethylene-glycol/oleic-acid ester, polyethylene-glycol/palmitic-acid ester and polyethylene-glycol/stearic-acid ester).

Coating of Polycarbonate Cellular Sheets

Cellular sheets consisting of a branched aromatic polycarbonate (relative solution viscosity 1.315, measured in respect of a solution of 0.5 g polycarbonate in 100 ml methylene chloride at room temperature), such as are used for the construction of greenhouses, were each coated on one side with the coating agents A to D in a flow-coating process and subsequently dried at 130° C. for 0.5 h. The layer thicknesses amounted to around 0.3 µm (thickness gauge ETA-SD-30 manufactured by ETA-Optik; interference method). The coatings had no surface faults and showed no interference pattern. The wetting with water was uniform. The contact angle of the water was below 1°.

Steam Test (100° C.)

As a further test, the steam test was carried out. In this connection the cellular sheets were exposed to a sealed water-vapour atmosphere at a temperature of 100° C. An observation is made as to when the water-spreading effect disappears and the first formation of drops occurs.

Result:

|  | Coating agent | Lifespan of the coating in the steam test |
|---|---|---|
| Example | A | over 3 hours |
| Comparative Example | copolyacrylate/silica-sol | 30 minutes |

In the case of the Comparative Example a clear detachment of the coating, with brownish discoloration of the water drops, could be observed after 30 minutes.

Model-greenhouse Test

The coated polycarbonate cellular sheets were attached at an angle of 60°, with the coated side down, to the ceiling of a model greenhouse, so that the water-spreading effect could be compared by observing the formation of droplets. Water was evaporated in the model greenhouse by means of a heating source, so that a temperature of 50° C. and a humidity of 100% set in.

The sheets were left for 6 h under these conditions and were subsequently heated for 4 h in a dry heating chamber at 40° C. Subsequently the procedure was repeated in the model greenhouse and in the heating chamber, always in alternating manner, for such time until the water-spreading effect disappeared (evident from the formation of drops on the sheet).

By way of comparison, three commercially available polycarbonate cellular sheets treated with a water-spreading coating, such as those used for greenhouse construction, were tested concomitantly.

Result:

|  | Coating | Lifespan of the coating (in cycles) |
|---|---|---|
| Example 1 | A | >80 |
| Example 2 | B | >80 |
| Example 3 | C | >80 |
| Example 4 | D | >80 |
| Comparative Example 5 | copolyacrylate/silica-sol | >80 |
| Comparative Example 6 | polyvinyl-pyrrolidone/silica-sol | 15 |
| Comparative Example 7 | surfactant/silica-sol | 15 |

What is claimed is:

1. A coated molding obtainable by coating at least a part of the surface of the molding with a coating agent consisting of 0.005 to 2 parts by weight of a compound represented by the formula (1)

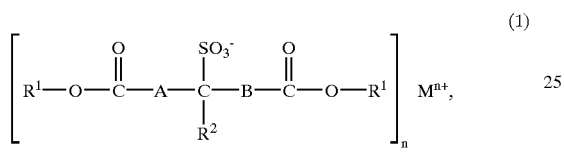

(1)

wherein
$R^1$ represents a hydrocarbon residue with 1 to 30 carbon atoms,
$R^2$ represents hydrogen or a hydrocarbon residue with 1 to 6 carbon atoms,
A represents a single bond or a divalent hydrocarbon residue with 1 to 30 carbon atoms,
B represents a single bond or a divalent hydrocarbon residue with 1 to 30 carbon atoms,
n represents 1, 2, 3 or 4 and
$M^{n+}$ represents a cation with a charge n,
1 to 20 parts by weight of one or more water-insoluble oxides of a metal or semi-metal,
80 to 100 parts by weight of a mixture of an acid and water, consisting of more than 90% water,
with the proviso that the pH value of the coating agent is less than 6 and wherein the molding consists of glass or a transparent thermoplastic.

2. The coated moulding according to claim 1, wherein the transparent thermoplastic is selected from the group consisting of polymethyl methacrylate, polystyrene, polyvinyl chloride, polyesters and polycarbonate.

3. A coated molding obtainable by coating at least a part of the surface of the molding with a coating agent consisting of 0.005 to 2 parts by weight of a compound represented by the formula (2)

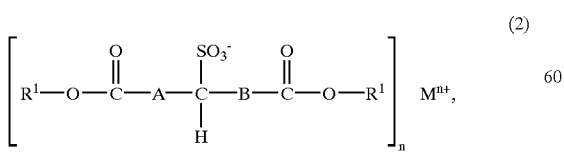

(2)

wherein
$R^1$ represents an aliphatic hydrocarbon residue with 1 to 30 carbon atoms,
A represents a single bond or a divalent aliphatic hydrocarbon residue with 1 to 3 carbon atoms,
B represents a single bond or a divalent aliphatic hydrocarbon residue with 1 to 3 carbon atoms,
n represents 1 or 2 and
$M^{n+}$ represents a cation with a charge n,
1 to 20 parts by weight of one or more water-insoluble oxides of a metal or semimetal from the 3rd or 4th main group or from the 2nd, 3rd, 4th, 5th, 6th, 7th or 8th subgroup of the periodic table of the elements,
80 to 100 parts by weight of a mixture of an acid and water, consisting of more than 90% water,
with the proviso that the pH value of the coating agent is less than 6 and wherein the molding consists of glass or a transparent thermoplastic.

4. A coated molding obtainable by coating at least a part of the surface of the molding with a coating agent consisting of 0.005 to 2 parts by weight of a compound represented by the formula (3)

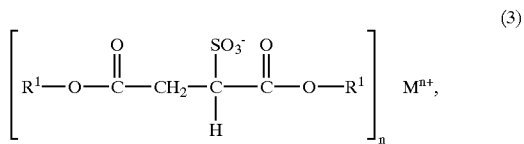

(3)

wherein
$R^1$ represents an aliphatic hydrocarbon residue with 1 to 30 carbon atoms,
n represents 1 or 2 and
$M^{n+}$ represents a cation with a charge n,
1 to 20 parts by weight of a sol of one or more water-insoluble oxides of a metal or semi-metal from the 3rd or 4th main group of the periodic table of the elements,
80 to 100 parts by weight of a mixture of a weak acid and water, consisting of more than 90% water,
with the proviso that the pH value of the coating agent is less than 6 and wherein the molding consists of glass or a transparent thermoplastic.

5. A coated molding obtainable by coating at least a part of the surface of the molding with a coating agent consisting of 0.005 to 2 parts by weight of a compound represented by the formula (3)

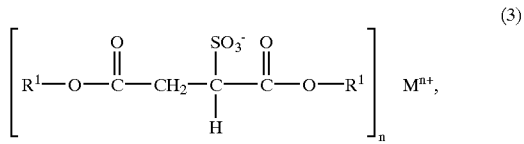

(3)

wherein
$R^1$ represents an aliphatic hydrocarbon residue with 1 to 30 carbon atoms,
n represents 1 or 2 and
$M^{n+}$ represents an alkali-metal cation (for n=1) or an alkaline-earth metal cation (for n=2),
1 to 20 parts by weight of a sol of a water-insoluble oxide of a metal or semi-metal from the 3rd or 4th main group of the periodic table of the elements,
80 to 100 parts by weight of a mixture of a weak acid and water, consisting of more than 90% water,
with the proviso that the pH value of the coating agent is less than 6 and wherein the molding consists of glass or a transparent thermoplastic.

6. A coated molding obtainable by coating at least a part of the surface of the molding with a coating agent consisting of 0.005 to 2 parts by weight of a compound represented by the formula (5)

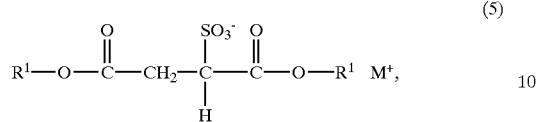

(5)

wherein
R$^1$ represents an aliphatic hydrocarbon residue with 1 to 30 carbon atoms and
M$^+$ represents an alkali-metal cation, 1 to 20 parts by weight of a sol of a water-insoluble oxide of a metal or semi-metal from the 4th main group of the periodic table of the elements, 80 to 100 parts by weight of a mixture of a weak acid and water, consisting of more than 90% water, with the proviso that the pH value of the coating agent is less than 6 and wherein the molding consists of glass or a transparent thermoplastic.

7. A coated molding obtainable by coating at least a part of the surface of the molding with a coating agent consisting of 0.005 to 2 parts by weight of a compound represented by the formula (1)

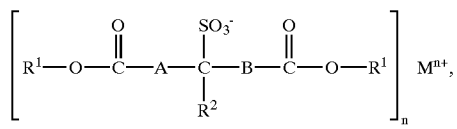

(1)

wherein
R$^1$ represents a hydrocarbon residue with 1 to 30 carbon atoms,
R$^2$ represents hydrogen or a hydrocarbon residue with 1 to 6 carbon atoms,
A represents a single bond or a divalent hydrocarbon residue with 1 to 30 carbon atoms,
B represents a single bond or a divalent hydrocarbon residue with 1 to 30 carbon atoms,
n represents 1, 2, 3 or 4 and
M$^{n+}$ represents a cation with a charge n, 1 to 20 parts by weight of one or more water-insoluble oxides of a metal or semi-metal, 80 to 100 parts by weight of a mixture of an acid and water, consisting of more than 90% water, with the proviso that the pH value of the coating agent is less than 6, the molding consists of glass or a transparent thermoplastic, and said coating has a thickness of 0.1 μm to 0.5 μm.

* * * * *